(12) United States Patent
Watanabe et al.

(10) Patent No.: US 10,644,628 B2
(45) Date of Patent: May 5, 2020

(54) MOTOR DRIVE DEVICE INCLUDING CURRENT DETECTOR

(71) Applicant: FANUC CORPORATION, Minamitsuru-gun, Yamanashi (JP)

(72) Inventors: Masato Watanabe, Yamanashi (JP); Taku Sasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/184,442

(22) Filed: Nov. 8, 2018

(65) Prior Publication Data

US 2019/0157997 A1    May 23, 2019

(30) Foreign Application Priority Data

Nov. 20, 2017 (JP) ................................. 2017-222835

(51) Int. Cl.
*H02P 6/28* (2016.01)
*H02P 6/15* (2016.01)

(52) U.S. Cl.
CPC . *H02P 6/28* (2016.02); *H02P 6/15* (2016.02)

(58) Field of Classification Search
CPC ...... H02P 1/00; H02P 1/04; H02P 1/46; H02P 3/00; H02P 3/16; H02P 3/18; H02P 5/00; H02P 5/40; H02P 21/00; H02P 23/00; H02P 25/00; H02P 27/00; H02P 27/04; H02P 27/06; H02P 23/0004; H02P 27/08; H02P 6/15; G05B 11/28; H02H 3/00; H02H 3/32; G01R 31/02; G01R 19/00; G01R 23/02; G01R 35/00; G01R 21/06

USPC .... 318/400.01, 400.02, 400.14, 400.15, 700, 318/701, 721, 727, 799, 800, 801, 430, 318/432, 601, 636, 722; 341/128, 129
See application file for complete search history.

(56) References Cited

U.S. PATENT DOCUMENTS

| 6,194,856 | B1 * | 2/2001 | Kobayashi | ............ H02M 7/003 318/432 |
| 7,898,210 | B2 * | 3/2011 | Hsieh | ................ H02M 7/53875 318/400.3 |
| 9,584,043 | B2 * | 2/2017 | Zhang | ................ H02M 7/5395 |

(Continued)

FOREIGN PATENT DOCUMENTS

| JP | 07-298674 A | 11/1995 |
| JP | 2008086124 A | 4/2008 |
| JP | 2010-252595 A | 11/2010 |

(Continued)

*Primary Examiner* — Antony M Paul
(74) *Attorney, Agent, or Firm* — RatnerPrestia

(57) ABSTRACT

A motor drive device includes a power conversion unit configured to supply a drive current to a motor, a current detector configured to detect a current flowing from the power conversion unit into the motor, an A/D converter configured to convert the current detected by the current detector into digital data and outputs the digital data, a motor control unit configured to control the drive current supplied from the power conversion unit to the motor, using the digital data output from the A/D converter, and a sampling adjustment unit configured to adjust a sampling operation of the A/D converter performed for the current detected by the current detector, in accordance with the response time taken after the current detector detects the current until the A/D converter outputs the digital data of the current.

8 Claims, 6 Drawing Sheets

(56) References Cited

U.S. PATENT DOCUMENTS 9,685,892 B2  6/2017  Sato
2008/0303470 A1* 12/2008  Schulz .................... H02P 5/74
                                                    318/562

FOREIGN PATENT DOCUMENTS

| JP | 2012-110074 A | 6/2012 |
| JP | 2013-062985 A | 4/2013 |
| JP | 2015-171215 A | 9/2015 |
| JP | 2017198649 A | 11/2017 |
| WO | 2013084289 A1 | 6/2013 |
| WO | WO-2013084289 A1 * | 6/2013 |
| WO | 2015159474 A1 | 10/2015 |

* cited by examiner

MOTOR DRIVE DEVICE INCLUDING CURRENT DETECTOR

CROSS-REFERENCE TO RELATED APPLICATION

This application is a new U.S. Patent Application that claims benefit of Japanese Patent Application No. 2017-222835, filed Nov. 20, 2017 for all purposes.

BACKGROUND OF THE INVENTION

1. Field of the Invention

The present invention relates to a motor drive device including a current detector.

2. Description of the Related Art

In a motor drive device which drives motors in a machine tool, forging machinery, an injection molding machine, industrial machinery, or an industrial robot, the speed, the torque, or the rotor position of any motor is instructed and controlled for the motor provided for each drive axis. In such a motor drive device, it is important to accurately detect the current flowing through the windings of any motor, by a current detection circuit including a current detector and an A/D (Analog-to-Digital) converter. The current in the windings of the motor detected by the current detector is converted into digital data by the A/D converter and used for motor drive control. As a current detection scheme for such a current detector, a current detector using a shunt resistor or a Hall element, for example, is available. As a conversion scheme for an A/D converter which converts the current detected by the current detector into digital data, a successive approximation A/D converter or a $\Delta\Sigma$ modulation A/D converter, for example, is available.

As disclosed in, e.g., Japanese Unexamined Patent Publication (Kokai) No. H07-298674, a noise suppression method for suppressing the influence of noise mixed during detection upon obtaining the average value of the latest measured value and N ($\geq$1) previous measured values obtained by detection at a predetermined sampling timing is known to set a lower limit value and an upper limit value, based on the present average value, determine whether the latest detected value falls within a range between the lower limit value and the upper limit value, employ the latest detected value as a latest measured value when the latest detected value falls within the range, and redo detection by discarding the latest detected value when the latest detected value falls outside the range.

As disclosed in, e.g., WO 13/084289, a power conversion device is known to include an inverter circuit which includes a parallel combination of series-connected switching element pairs corresponding to the respective phases of a multiphase AC motor and allows each phase voltage for driving the motor to be extracted from a connection point between the switching elements in each series-connected switching element pair, a current detection resistor connected in series with each of the series-connected switching element pairs, a current detection means for detecting a current flowing through the motor, for each phase, an A/D conversion means, provided in the current detection means, for converting a current detection signal detected by the current detection means into a digital signal and performing current value detection processing, a control unit which outputs a drive signal for performing PWM control of each switching element of the inverter circuit, based on a duty ratio set value or a voltage command value of a voltage applied to each phase of the motor, and a current detection phase selection means for selecting the current detection signal detected by each of the current detection means and controlling a timing of the current value detection processing by the A/D conversion means, wherein the current detection phase selection means determines the timing of the current value detection processing by the A/D conversion means in one period of a PWM pulse that is a carrier for the PWM control, based on the voltage command value or the duty ratio set value.

As disclosed in, e.g., Japanese Unexamined Patent Publication (Kokai) No. 2015-171215, a motor control device which performs ON/OFF control of a plurality of switching elements connected in a three-phase bridge configuration, in accordance with a predetermined PWM signal pattern, to drive a motor via an inverter circuit which converts a direct current into a three-phase alternating current is known to include a current detection element which is connected to a DC side of the inverter circuit and generates a signal corresponding to a current value, a rotor position determination means for determining a rotor position, based on a phase current of the motor, a PWM signal generation means for generating a three-phase PWM signal pattern to follow the rotor position, and a current detection means for detecting the phase current of the motor, based on the PWM signal pattern and the signal generated by the current detection element, wherein the PWM signal generation means changes a duty in both a retard direction and an advance direction with reference to an arbitrary phase in a carrier period, for a first phase of the three-phase PWM signal pattern, changes the duty in one direction of the retard direction and the advance direction with reference to an arbitrary phase in the carrier period, for a second phase, and changes the duty in a direction opposite to the one direction with reference to an arbitrary phase in the carrier period, for a third phase, and the device further includes a timing adjustment means for, when the current detection means detects a two-phase current at a timing fixed in the carrier period of the PWM signal and becomes incapable of detecting the two-phase current at the fixed timing, adjusting a detection timing to allow detection of a current at a variable timing corresponding to a magnitude of a voltage output to the inverter circuit, for at least one phase.

As disclosed in, e.g., Japanese Unexamined Patent Publication (Kokai) No. 2013-062985, a rotating electrical machine control device which detects an actual current flowing through a rotating electrical machine and controls the rotating electrical machine by performing current feedback control to bring the actual current close to a target current for the rotating electrical machine is known to include a sampling period setting unit which sets a sampling period in which a detected current is obtained by sampling the actual current containing an AC frequency component, a current sampling unit which obtains the detected current by sampling the actual current in accordance with the sampling period, and a current control unit which performs the current feedback control, based on the detected current and the target current, upon setting of a response region to make a response to input of a frequency component in a predetermined frequency region, wherein the sampling period setting unit sets the sampling period in accordance with a rotation speed of the rotating electrical machine so that at least one of a plurality of aliasing frequencies of the detected current detected due to aliasing falls outside the response region of the current control unit.

As disclosed in, e.g., Japanese Unexamined Patent Publication (Kokai) No. 2012-110074, a current detection device which detects a current output from a multiphase inverter using triangular wave pulse width modulation is known to include a current detection means for detecting a current for each of a plurality of specific timings in a given period set in advance, and an addition means for summing current detection values for each of the plurality of specific timings in the given period, wherein the current detection means detects the current at least once on each of a leading edge and a trailing edge of a carrier of the triangular wave PWM, as the plurality of specific timings in the given period.

As disclosed in, e.g., Japanese Unexamined Patent Publication (Kokai) No. 2010-252595, a motor drive device including current feedback control based on PWM control, using a current detector which detects a motor current, is known to include a carrier signal generator which outputs a triangular wave carrier signal, a motor current detector which detects an average current value in a given interval, a current detection timing generator which outputs a current detection trigger with reference to the carrier signal, a current controller which performs current control to make the average current value detected by the motor current detector follow a current command value and updates a voltage command value at a peak and a trough of the carrier signal, and a PWM controller which receives the carrier signal and the voltage command value and outputs a PWM signal to an inverter unit, wherein a period of the peak and the trough of the carrier signal is matched with a time of the given interval in which the average current value is detected.

SUMMARY OF INVENTION

With the development of technology regarding parts constituting a current detection circuit located in a motor drive device, the response characteristic (response speed) of a current detection circuit which detects a current by a current detector and outputs digital data by an A/D converter is improving, and the response time taken after current detection until digital data output is increasingly shortening. In newly designing, maintaining, or retrofitting a motor drive device, the response characteristic of current detection is improved using a latest current detection circuit, to improve any type of motor controllability such as the motor acceleration and deceleration time, feed smoothness, or motor output.

When a plurality of current detection circuits located in the motor drive device or current detection circuits before and after replacement have a difference in response characteristic (response speed) in the period after current detection until digital data output, the current detection value converted into digital data output from the current detection circuit varies even for the same current magnitude. The difference in response characteristic (response speed) occurs between the current detection circuits due to, e.g., the difference in current detection scheme based on whether a current detector uses a shunt resistor or a Hall element, the difference in performance based on whether the current detector uses an old or new model, or the differences between individual parts (part-related variations) constituting the current detector. For example, the response time is shorter (the response speed is higher) in a current detector using a shunt resistor than in a current detector using a Hall element. Further, upon a comparison even between current detectors of the same detection scheme, the response time is shorter (the response speed is higher) in a new model than in an old model. When a current detection value converted into digital data having variations for each such current detection circuit is used for current control in the motor drive device, this adversely affects the motor controllability.

In replacing a current detection circuit used for the motor drive device, the compatibility of response time (response speed) is often important before and after replacement. When, for example, various circuits (e.g., a current control unit and a power conversion circuit) in the motor drive device are used as in the conventional technique, and only a current detection circuit is replaced, a current detection circuit including a conventional current detector having a long response time (low response speed) is more preferable than a current detection circuit including a latest current detector having a short response time (high response speed), in terms of maintaining a given motor controllability. However, the conventional current detector or current detection circuit may no longer be manufactured and may be already unavailable. Further, a current detection circuit including a latest current detector may be superior in, e.g., cost, size, thermal resistance, or humidity resistance to a current detection circuit including a conventional current detector, and in such a case, the use of the conventional current detection circuit by placing importance on maintenance of a given motor controllability is inefficient from a comprehensive viewpoint.

It is, therefore, desired to implement a motor drive device capable of maintaining a given motor controllability independently of the difference in response characteristic of a current detection circuit including a current detector and an A/D converter.

According to one aspect of the present disclosure, a motor drive device includes a power conversion unit configured to supply a drive current to a motor, a current detector configured to detect a current flowing from the power conversion unit into the motor, an A/D converter configure to convert the current detected by the current detector into digital data and outputs the digital data, a motor control unit configured to control the drive current supplied from the power conversion unit to the motor, using the digital data output from the A/D converter, and a sampling adjustment unit configured to adjust a sampling operation of the A/D converter performed for the current detected by the current detector, in accordance with a response time taken after the current detector detects the current until the A/D converter outputs the digital data of the current.

BRIEF DESCRIPTION OF THE DRAWINGS

The present invention will be more clearly understood with reference to the following accompanying drawings.

DETAILED DESCRIPTION

A motor drive device including a current detector will be described below with reference to the drawings. These drawings use different scales as appropriate to facilitate an understanding. The mode illustrated in each drawing is one example for carrying out the present invention, and the present invention is not limited to the embodiments illustrated in these drawings.

Figure 1:
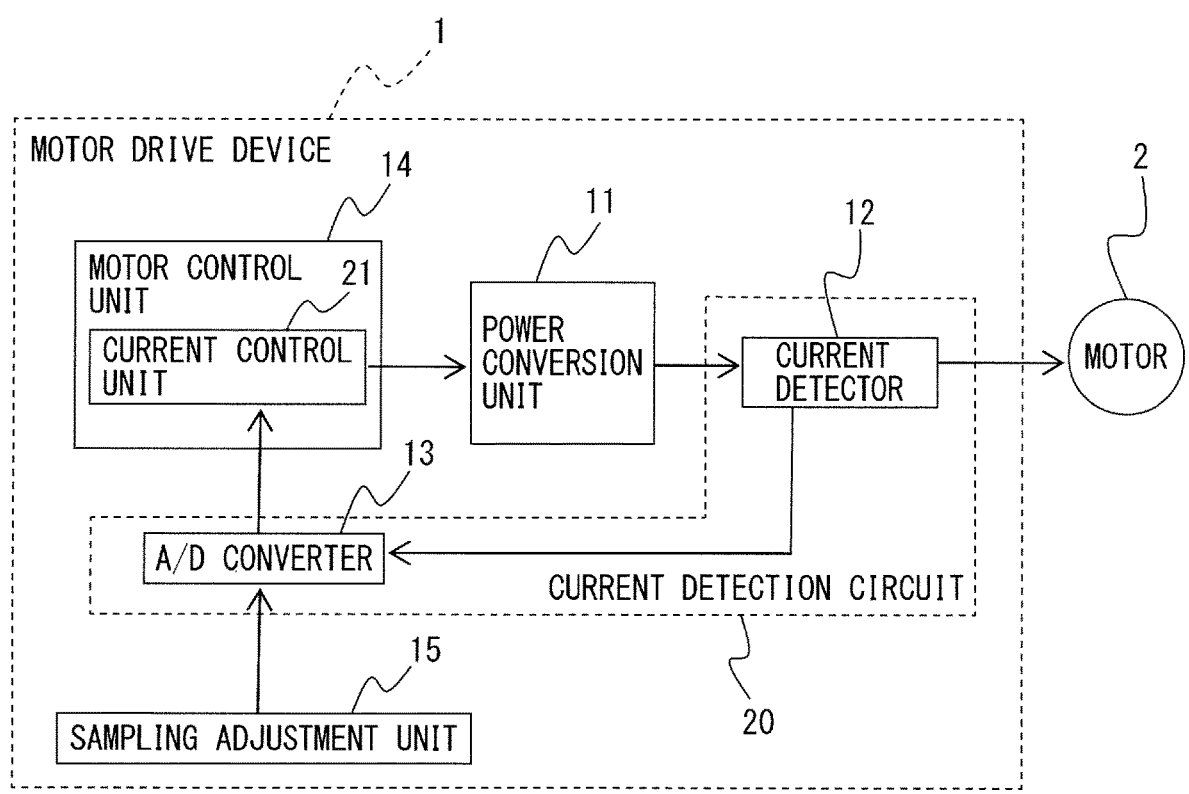
FIG. 1 is a block diagram illustrating a motor drive device according to one embodiment.

FIG. 1 is a block diagram illustrating a motor drive device according to an embodiment of the present disclosure. The case where a motor 2 is driven by a motor drive device 1 will be taken as an example herein. Machines equipped with the motor 2 include, e.g., a machine tool, a robot, forging machinery, an injection molding machine, industrial machinery, various electrical appliances, an electric train, an automobile, and an aircraft. The type of motor 2 is not intended to particularly limit this embodiment, and the motor 2 may serve as a DC motor or an AC motor. The number of motors 2 is not intended to particularly limit this embodiment, either. Referring to FIG. 1, for the sake of simplicity, only one pair of a current detector 12 and an A/D converter 13 is provided, but a plurality of pairs of current detectors 12 and A/D converters 13 may be provided in accordance with, e.g., the type of motor 2 or the method for controlling the motor 2. When, for example, the motor 2 serves as a three-phase AC motor, pairs of current detectors 12 and A/D converters 13 are provided for two or all of the three phases. When, for example, the motor 2 serves as a single-phase AC motor, a current detector 12 and an A/D converter 13 are provided for each phase. When, for example, the motor 2 serves as a DC motor, a current detector 12 and an A/D converter 13 are provided on, e.g., a cathode-side power supply line.

The motor drive device 1 according to one embodiment that drives the motor 2 includes a power conversion unit 11, a current detector 12, an A/D converter 13, a motor control unit 14, and a sampling adjustment unit 15. The current detector 12 and the A/D converter 13 constitute a current detection circuit 20.

The power conversion unit 11 is controlled based on a command from the motor control unit 14 and supplies a drive current to the motor 2. When the motor 2 serves as an AC motor, the power conversion unit 11 includes, e.g., a rectifier configured to convert AC power supplied from an AC power supply into DC power, and an inverter configured to convert the DC power into AC power and supplies AC drive power to the motor 2. Alternatively, for example, the power conversion unit 11 is implemented as an inverter configured to convert DC power supplied from a battery into AC power and supplies AC drive power to the motor 2. When the motor 2 serves as a DC motor, the power conversion unit 11 is implemented as, e.g., a rectifier configured to convert AC power supplied from an AC power supply into DC power and supplies a DC drive current to the motor 2, or a DC/DC converter configured to convert a DC voltage applied from a battery into an appropriate DC voltage and supplies a DC drive current to the motor 2. The configuration of the power conversion unit 11 defined herein is merely illustrative, and the configuration of the power conversion unit 11 may be defined including terms such as a power supply or a battery.

The current detector 12 detects a current flowing from the power conversion unit 11 into the motor 2. As a current detection scheme for the current detector 12, a current detector using a shunt resistor or a Hall element, for example, is available. An analog signal related to the current detected by the current detector 12 is input to the A/D converter 13.

The A/D converter 13 converts the analog signal related to the current detected by the current detector 12 into digital data and outputs the digital data. The A/D converter 13 performs sampling processing for taking the amplitude values of a continuous analog signal related to the current detected by the current detector 12 with discrete periods (sampling periods), quantization processing for approximating the amplitude values taken with the discrete periods by discrete amplitude values, and encoding processing for converting the discrete amplitude values into codes represented by binary values: "0" and "1." As an analog-to-digital conversion scheme for the A/D converter 13, a successive approximation A/D converter and a $\Delta\Sigma$ modulation A/D converter, for example, are available. Digital data related to the current output from the A/D converter 13 is input to the motor control unit 14.

The motor control unit 14 controls a drive current supplied from the power conversion unit 11 to the motor 2, using the digital data output from the A/D converter 13. More specifically, the following operation is performed: The motor control unit 14 generates a current command based on the speed (speed feedback) of the motor 2 detected by a speed detector (not illustrated) and a predetermined speed command for the motor 2, in accordance with an operation program for the motor 2. The current control unit 21 in the motor control unit 14 generates a command for controlling the speed, the torque, or the rotor position of the motor 2, based on the current command and digital data (current feedback) related to the current flowing into the motor 2 and input from the A/D converter 13. The power conversion unit 11 is controlled based on the command from the motor control unit 14 and supplies a drive current to the motor 2. With this operation, the motor 2 has its speed, torque, or rotor position controlled based on the drive current supplied from the power conversion unit 11. The configuration of the motor control unit 14 defined herein is merely illustrative, and the configuration of the motor control unit 14 may be defined including terms such as a position command generation unit, a speed command unit, a torque command generation unit, and a switching command generation unit.

The sampling adjustment unit 15 adjusts a sampling operation of the A/D converter 13 performed for the current detected by the current detector 12, in accordance with the response time (response characteristic) taken after the current detector 12 detects a current until the A/D converter 13 outputs digital data of the current. The response time taken after the current detector 12 detects a current until the A/D converter 13 outputs digital data of the current represents the response characteristic of the current detector 12 of the current detection circuit 20 including the current detector 12 and the A/D converter 13, and the current detector 12 exhibits a better response characteristic for a shorter response time. Since a filter unit (not illustrated) and the like are placed in the input stage of the A/D converter 13, the "response time (response characteristic) of the current detector 12" is more specifically defined as the "summed response time (response characteristic) of the response time (response characteristic) of the current detector 12 and the response times (response characteristics) of the filter unit and the like placed in the output stage of the current detector 12." In this specification, for the sake of simplicity, the "response times (response characteristics) of the current detector 12 and the succeeding filter unit and the like" will be simply referred to as the "response time (response characteristic) of the current detector 12." The response characteristic of the current detector 12 can be represented by the response speed in place of the response time. The response speed of the current detector 12 is defined as the processing speed of the current detector 12 until the current detected by the current detector 12 is encoded into digital data and output by the A/D converter 13. According to this definition, the higher the response speed of the current detector 12, the better the response characteristic of the current detector 12. The operation of the sampling adjustment unit 15 will be described in detail later.

The above-mentioned motor control unit 14 and sampling adjustment unit 15 may be constructed in, e.g., software program form, and in this case, the function of each unit is implemented by causing an arithmetic processing device in the motor drive device 1 to operate the software program. Alternatively, the function of the sampling adjustment unit 15 may be implemented by mounting in, e.g., an existing motor drive device, a semiconductor integrated circuit in which a software program for implementing the function of the sampling adjustment unit 15 is written.

The operation of the sampling adjustment unit 15 will be subsequently described in more detail, individually for the case (first mode) where the A/D converter 13 serves as a successive approximation A/D converter and the case (second mode) where the A/D converter 13 serves as a ΔΣ modulation A/D converter.

Figure 2A:
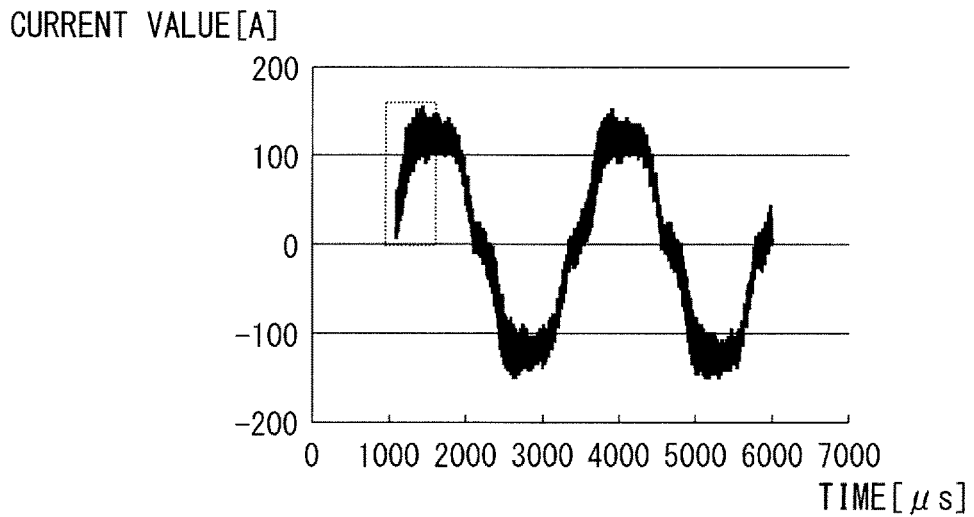
FIG. 2A is a graph for explaining the relationship between the actual current flowing from a power conversion unit into a motor and the current detected by a current detector in a successive approximation A/D converter and illustrates an exemplary waveform of the current detected by the current detector.
Figure 2B:
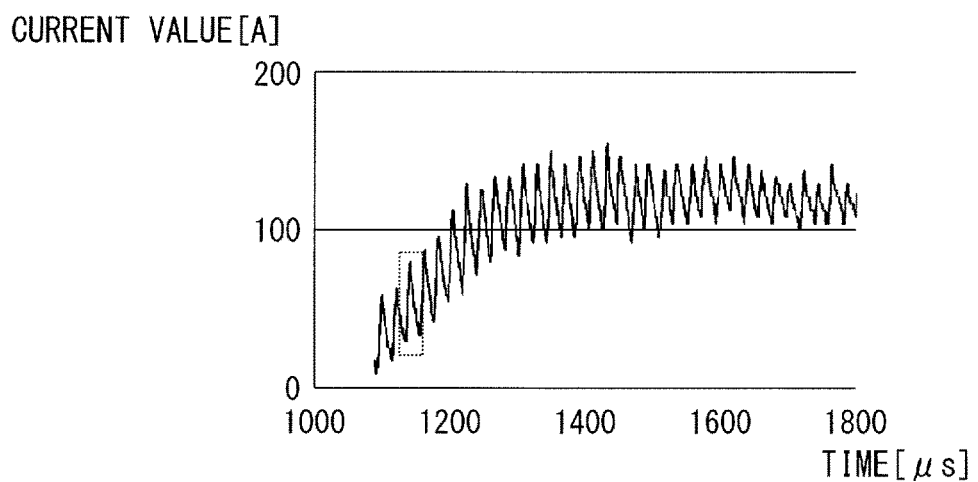
FIG. 2B is a graph for explaining the relationship between the actual current flowing from the power conversion unit into the motor and the current detected by the current detector in the successive approximation A/D converter and illustrates an enlarged view of a portion bounded by a dotted line in the waveform of the detected current illustrated in FIG. 2A.
Figure 2C:
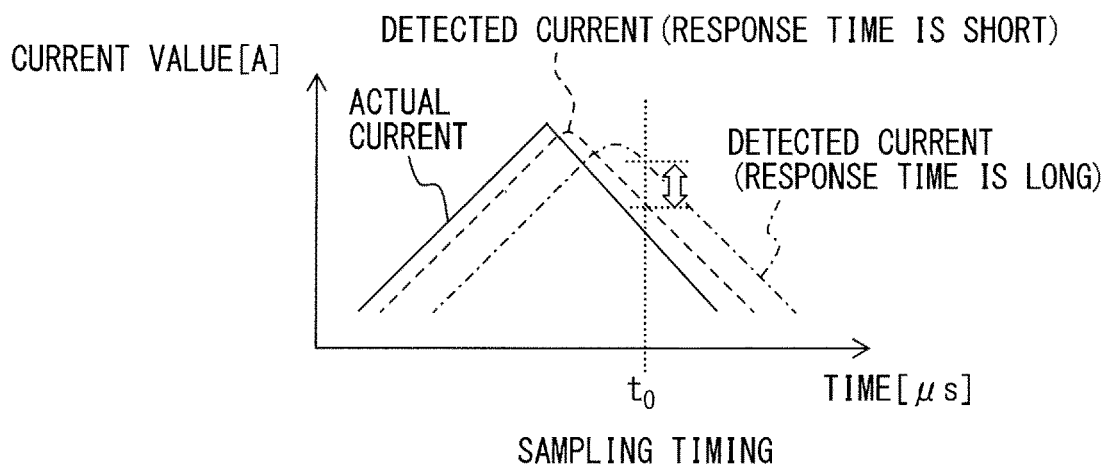
FIG. 2C is a graph for explaining the relationship between the actual current flowing from the power conversion unit into the motor and the current detected by the current detector in the successive approximation A/D converter and schematically illustrates the relationship with the actual current in an enlarged view of a portion bounded by a dotted line in the waveform of the detected current illustrated in FIG. 2B.

FIG. 2A is a graph for explaining the relationship between the actual current flowing from a power conversion unit into a motor and the current detected by a current detector in a successive approximation A/D converter and illustrates an exemplary waveform of the current detected by the current detector. FIG. 2B is a graph for explaining the relationship between the actual current flowing from the power conversion unit into the motor and the current detected by the current detector in the successive approximation A/D converter and illustrates an enlarged view of a portion bounded by a dotted line in the waveform of the detected current illustrated in FIG. 2A. FIG. 2C is a graph for explaining the relationship between the actual current flowing from the power conversion unit into the motor and the current detected by the current detector in the successive approximation A/D converter and schematically illustrates the relationship with the actual current in an enlarged view of a portion bounded by a dotted line in the waveform of the detected current illustrated in FIG. 2B.

Due to the difference in response characteristic (detection rate) of the current detector 12, the detected current output from the current detector 12 varies for the same actual current. The current detector 12, for example, has a shorter response time (higher response speed) when it uses a shunt resistor than when it uses a Hall element. As illustrated in FIG. 2C, for the waveform of the same actual current, the waveform (indicated by an alternate long and short dashed line in FIG. 2C) of a current detector 12 having a long response time is delayed in time compared to the waveform (indicated by a broken line in FIG. 2C) of a current detector 12 having a short response time. When the response characteristic (detection rate) of the current detector 12 varies in this manner, the successive approximation A/D converter 13 placed in the output stage of the current detector 12 performs a sampling operation at the same timing (time $t_0$), and the current value of digital data output from the A/D converter 13 varies depending on the difference in response characteristic (detection rate) of the current detector 12. In view of this, the sampling adjustment unit 15 according to the first mode corresponding to the case where the A/D converter 13 serves as a successive approximation A/D converter adjusts the period in which the sampling timing of the A/D converter 13 is set, so that the current value of identical digital data is stably output from the A/D converter 13 for the same actual current, independently of the difference in response characteristic (detection rate) of the current detector 12.

The sampling adjustment unit 15 according to the first mode corresponding to the case where the A/D converter 13 serves as a successive approximation A/D converter performs adjustment to change the period in which the sampling timing of the successive approximation A/D converter 13 is set for the current detected by the current detector 12, in accordance with the response time taken after the current detector 12 detects a current until the A/D converter 13 outputs digital data of the current. More specifically, the sampling adjustment unit 15 according to the first mode performs adjustment to temporally delay the sampling timing when the response time is longer than a predetermined target time and performs adjustment to temporally advance the sampling timing when the response time is shorter than the target time, so that digital data identical to that obtained when sampling is performed at a sampling timing set in correspondence with the target time is output from the A/D converter 13. When the response characteristic of the current detector 12 is represented by the "response speed" in place of the "response time," the "target time" can be represented by the "target speed."

Figure 3:
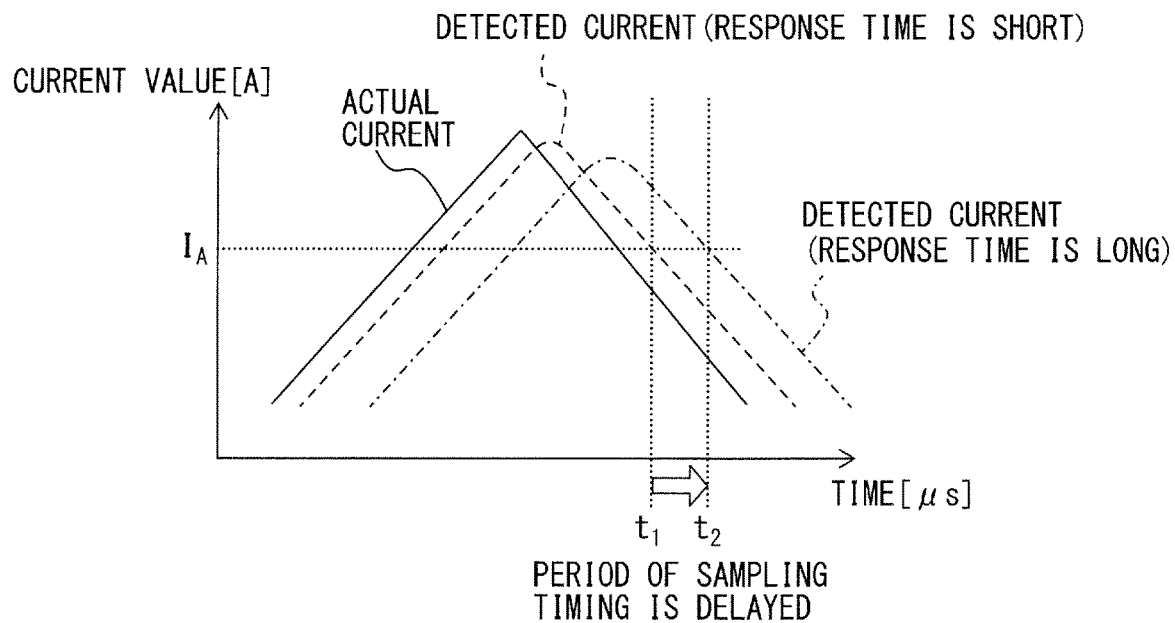
FIG. 3 is a graph for explaining adjustment of a sampling operation by a sampling adjustment unit according to a first mode when the characteristics of a current detector having a long response time are matched with those of a current detector having a short response time.

FIG. 3 is a graph for explaining adjustment of a sampling operation by a sampling adjustment unit according to the first mode when the characteristics of a current detector having a long response time are matched with those of a current detector having a short response time. When the response time taken after the current detector 12 detects a current until the A/D converter 13 outputs digital data of the current is longer than a predetermined target time, the sampling adjustment unit 15 according to the first mode performs adjustment to delay the period in which the sampling timing is set, so that digital data identical to that obtained when sampling is performed at a sampling timing set in correspondence with the target time is output from the successive approximation A/D converter 13. The case where, for example, a current detection circuit 20 including a current detector 12 having a long response time (low response speed) is adjusted so that digital data identical to that obtained by a current detector having a short response time (high response speed) is output from the current detection circuit 20 corresponds to this adjustment example. In other words, the response time in a current detector having a short response time corresponds to the above-mentioned "target time," and an A/D converter 13 in a current detection circuit 20 including a current detector 12 having a long response time corresponds to the target to be adjusted by the sampling adjustment unit 15 according to the first mode. As illustrated in, e.g., FIG. 3, the sampling adjustment unit 15 is used to delay the sampling timing of an A/D converter 13 in a current detection circuit 20 including a current detector 12 having a long response time to be adjusted from original time $t_1$ until time $t_2$ that is the sampling timing of an A/D converter in a current detection circuit having a short response time, so that a current value $I_A$ of digital data identical to that obtained by the A/D converter in the current detection circuit including the current detector having a short response time is output from the A/D converter 13 in the current detection circuit 20 including the current detector 12 having a long response time to be adjusted, for the value of the same actual current ($I_A$ in FIG. 3).

The duration from time $t_1$ to time $t_2$ corresponds to the amount of adjustment applied by the sampling adjustment unit 15 according to the first mode to the A/D converter 13 in the current detection circuit 20 including the current detector 12 having a long response time to be adjusted. Since the current detection rate is higher in a shunt resistor type current detector than in a Hall element type current detector, when, for example, the characteristics of a shunt resistor type current detector 12 are matched with those of a Hall element type current detector, the sampling adjustment unit 15 according to the first mode delays the period in which the sampling timing of the successive approximation A/D converter 13 placed in the output stage of the shunt resistor type current detector 12 is set, to match this sampling timing with that of the ΔΣ modulation A/D converter 13 placed in the output stage of the shunt resistor type current detector.

Figure 4:
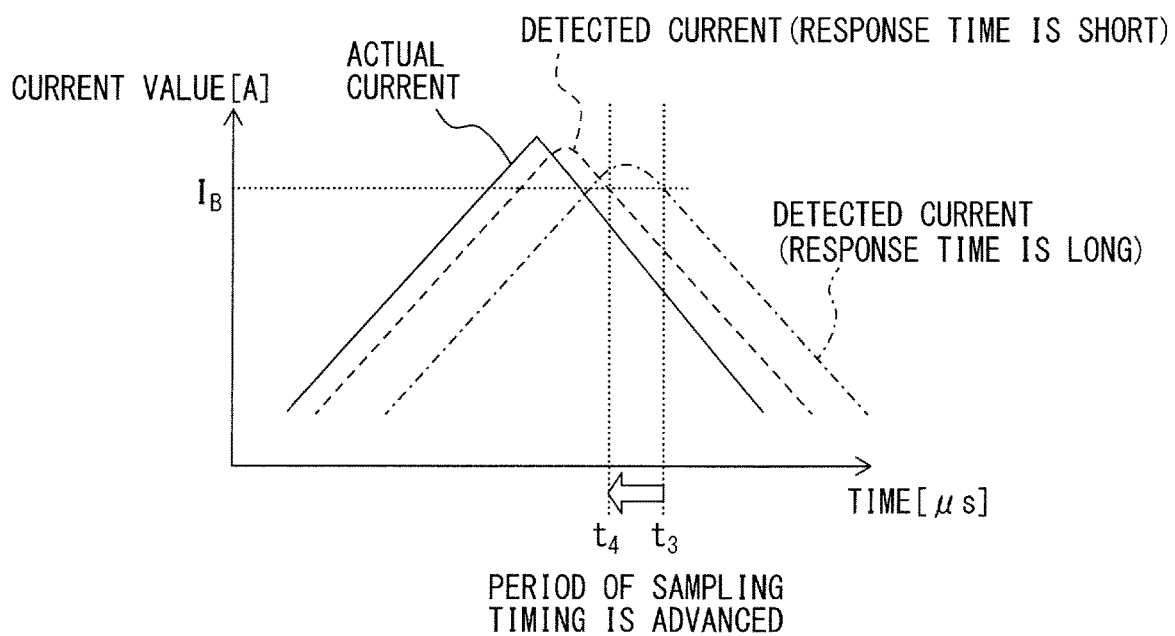
FIG. 4 is a graph for explaining adjustment of a sampling operation by the sampling adjustment unit according to the first mode when the characteristics of a current detector having a short response time are matched with those of a current detector having a long response time.

FIG. 4 is a graph for explaining adjustment of a sampling operation by the sampling adjustment unit according to the first mode when the characteristics of a current detector having a short response time are matched with those of a current detector having a long response time. When the response time taken after the current detector 12 detects a current until the A/D converter 13 outputs digital data of the current is shorter than a predetermined target time, the sampling adjustment unit 15 according to the first mode performs adjustment to advance the period in which the sampling timing is set, so that digital data identical to that obtained when sampling is performed at a sampling timing set in correspondence with the target time is output from the successive approximation A/D converter 13. The case where, for example, a current detection circuit 20 including a current detector 12 having a short response time (high response speed) is adjusted so that digital data identical to that obtained by a current detector having a long response time (low response speed) is output from the current detection circuit 20 corresponds to this adjustment example. In other words, the response time in a current detector having a long response time corresponds to the above-mentioned "target time," and an A/D converter 13 in a current detection circuit 20 including a current detector 12 having a short response time corresponds to the target to be adjusted by the sampling adjustment unit 15 according to the first mode. As illustrated in, e.g., FIG. 4, the sampling adjustment unit 15 is used to delay the sampling timing of an A/D converter 13 in a current detection circuit 20 including a current detector 12 having a short response time to be adjusted from original time $t_3$ until time $t_4$ that is the sampling timing of an A/D converter in a current detection circuit including a current detector having a long response time, so that a current value $I_B$ of digital data identical to that obtained by the A/D converter in the current detection circuit including the current detector having a long response time is output from the A/D converter 13 in the current detection circuit 20 including the current detector 12 having a short response time to be adjusted, for the value of the same actual current ($I_B$ in FIG. 3). The duration from time $t_3$ to time $t_4$ corresponds to the amount of adjustment applied by the sampling adjustment unit 15 according to the first mode to the A/D converter 13 in the current detection circuit 20 including the current detector 12 having a short response time to be adjusted. Since the current detection rate is higher in a shunt resistor type current detector than in a Hall element type current detector, when, for example, the characteristics of a Hall element type current detector 12 are matched with those of a shunt resistor type current detector, the sampling adjustment unit 15 according to the first mode advances the period in which the sampling timing of the successive approximation A/D converter 13 placed in the output stage of the Hall element type current detector 12 is set, to match this sampling timing with that of the ΔΣ modulation A/D converter 13 placed in the output stage of the Hall element type current detector.

Figure 5:
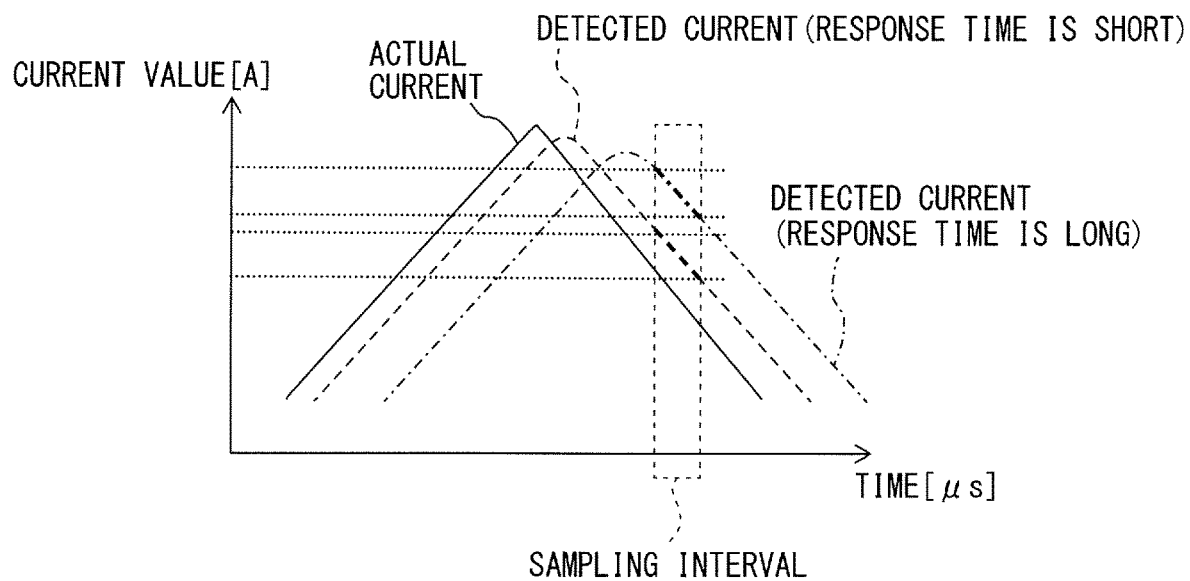
FIG. 5 is a graph schematically illustrating the relationship between the actual current flowing from a power conversion unit into a motor and the current detected by a current detector in a $\Delta\Sigma$ modulation A/D converter.

FIG. 5 is a graph schematically illustrating the relationship between the actual current flowing from a power conversion unit into a motor and the current detected by a current detector in a ΔΣ modulation A/D converter. In the ΔΣ modulation A/D converter 13, since analog data in a certain sampling interval is averaged and then analog-to-digital converted, digital data output from the ΔΣ modulation A/D converter 13 is limited to that in the sampling interval of the current value detected by the current detector 12. As already described above, due to the difference in response characteristic (detection rate) of the current detector 12, the detected current output from the current detector 12 varies for the same actual current. When the response characteristic (detection rate) of the current detector 12 varies in this manner, the ΔΣ modulation A/D converter 13 placed in the output stage of the current detector 12 obtains different analog data even in the same sampling interval and, in turn, obtains different average values of the analog data in this sampling interval, so that the current value of digital data output from the A/D converter 13 varies depending on the difference in response characteristic (detection rate) of the current detector 12. In view of this, the sampling adjustment unit 15 according to the second mode corresponding to the case where the A/D converter 13 serves as a ΔΣ modulation A/D converter adjusts the period in which the sampling interval of the A/D converter 13 is set, so that the current value of identical digital data is stably output from the A/D converter 13, independently of the difference in response characteristic (detection rate) of the current detector 12.

The sampling adjustment unit 15 according to the second mode corresponding to the case where the A/D converter 13 serves as a ΔΣ modulation A/D converter performs adjustment to change the period in which the sampling interval of the ΔΣ modulation A/D converter 13 is set for the current detected by the current detector 12, in accordance with the response time taken after the current detector 12 detects a current until the A/D converter 13 outputs digital data of the current. More specifically, the sampling adjustment unit 15 according to the second mode performs adjustment to temporally delay the sampling interval when the response time is longer than a predetermined target time and performs adjustment to temporally advance the sampling interval when the response time is shorter than the target time, so that digital data identical to that obtained when sampling is performed in a sampling interval set in correspondence with the target time is output from the A/D converter 13.

Figure 6:
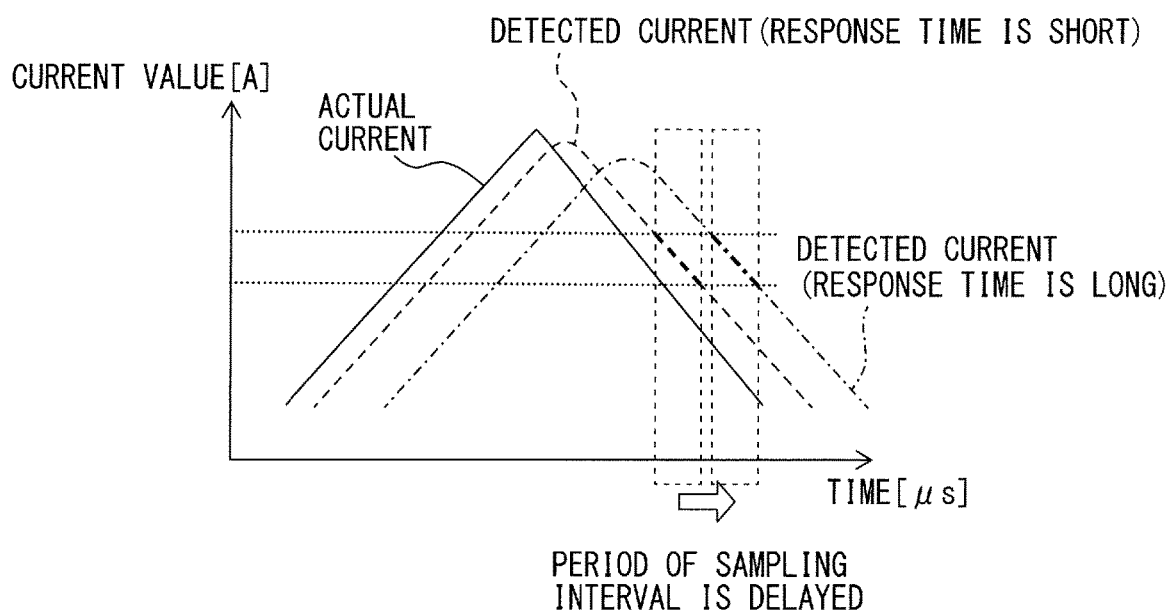
FIG. 6 is a graph for explaining adjustment of a sampling operation by a sampling adjustment unit according to a second mode when the characteristics of a current detector having a long response time are matched with those of a current detector having a short response time.

FIG. 6 is a graph for explaining adjustment of a sampling operation by a sampling adjustment unit according to the second mode when the characteristics of a current detector having a long response time are matched with those of a current detector having a short response time. When the response time taken after the current detector 12 detects a current until the A/D converter 13 outputs digital data of the current is longer than a predetermined target time, the sampling adjustment unit 15 according to the second mode performs adjustment to delay the period in which the sampling interval is set, so that digital data identical to that obtained when sampling is performed at a sampling timing set in correspondence with the target time is output from the ΔΣ modulation A/D converter 13. The case where, for example, a current detection circuit 20 including a current detector 12 having a long response time (low response speed) is adjusted so that digital data identical to that obtained by a current detection circuit including a current detector having a short response time (high response speed) is output from the current detection circuit 20 corresponds to this adjustment example. In other words, the response time in a current detector having a short response time corresponds to the above-mentioned "target time," and an A/D converter 13 in a current detection circuit 20 including a current detector 12 having a long response time corresponds to the target to be adjusted by the sampling adjustment unit 15 according to the second mode. As illustrated in, e.g., FIG. 6, the sampling adjustment unit 15 is used to delay the sampling interval of an A/D converter 13 in a current detection circuit 20 including a current detector 12 having a long response time to be adjusted until the same time as the sampling interval of an A/D converter in a current detection circuit including a current detector having a short response time, so that a current value of digital data identical to that obtained by the A/D converter in the current detection circuit including the current detector having a short response time is output from the A/D converter 13 in the current detection circuit 20 including the current detector 12 having a long response time to be adjusted, for the value of the same actual current. The time obtained by delaying the sampling interval corresponds to the amount of adjustment applied by the sampling adjustment unit 15 according to the second mode to the A/D converter 13 in the current detection circuit 20 including the current detector 12 having a long response time to be adjusted. When, for example, the characteristics of a shunt resistor type current detector 12 are matched with those of a Hall element type current detector, the sampling adjustment unit 15 according to the second mode delays the period in which the sampling interval of the successive approximation A/D converter 13 placed in the output stage of the shunt resistor type current detector 12 is set, to match this sampling interval with that of the ΔΣ modulation A/D converter 13 placed in the output stage of the shunt resistor type current detector.

Figure 7:
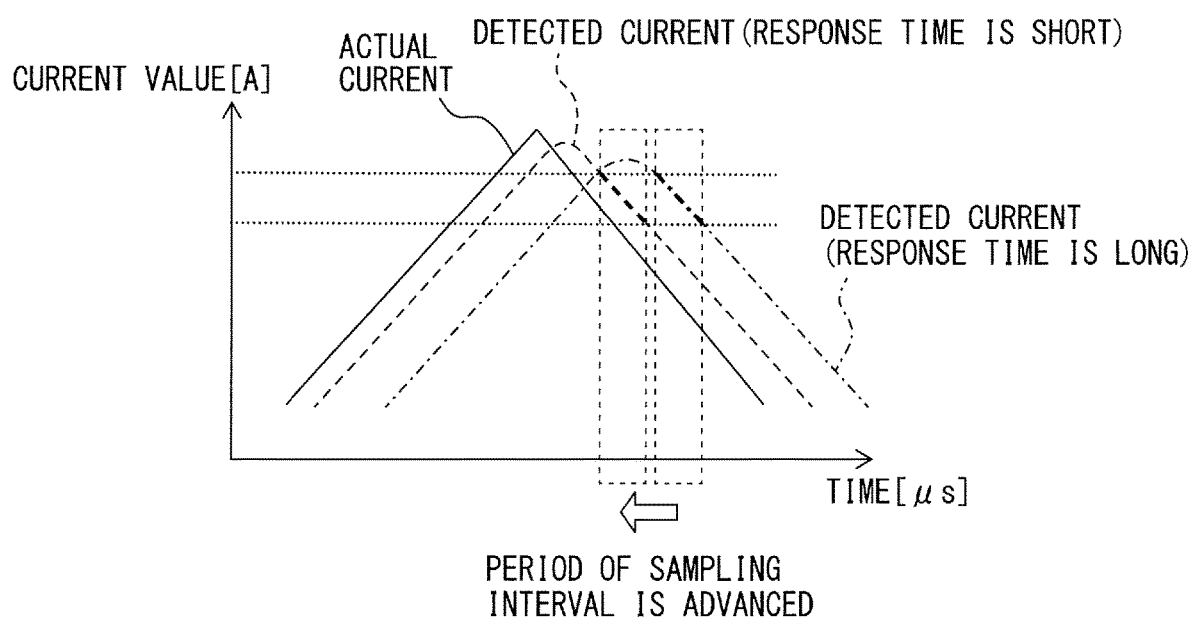
FIG. 7 is a graph for explaining adjustment of a sampling operation by the sampling adjustment unit according to the second mode when the characteristics of a current detector having a short response time are matched with those of a current detector having a long response time.

FIG. 7 is a graph for explaining adjustment of a sampling operation by the sampling adjustment unit according to the second mode when the characteristics of a current detector having a short response time are matched with those of a current detector having a long response time. When the response time taken after the current detector 12 detects a current until the A/D converter 13 outputs digital data of the current is shorter than a predetermined target time, the sampling adjustment unit 15 according to the second mode performs adjustment to advance the period in which the sampling interval is set, so that digital data identical to that obtained when sampling is performed at a sampling timing set in correspondence with the target time is output from the ΔΣ modulation A/D converter 13. The case where, for example, a current detection circuit 20 including a current detector 12 having a short response time (high response speed) is adjusted so that digital data identical to that obtained by a current detection circuit including a current detector having a long response time (low response speed) is output from the current detection circuit 20 corresponds to this adjustment example. In other words, the response time in a current detector having a long response time corresponds to the above-mentioned "target time," and an A/D converter 13 in a current detection circuit 20 including a current detector 12 having a short response time corresponds to the target to be adjusted by the sampling adjustment unit 15 according to the second mode. As illustrated in, e.g., FIG. 7, the sampling adjustment unit 15 is used to delay the sampling interval of an A/D converter 13 in a current detection circuit 20 including a current detector 12 having a short response time to be adjusted until the same time as the sampling interval of an A/D converter in a current detection circuit including a current detector having a long response time, so that a current value of digital data identical to that obtained by the A/D converter in the current detection circuit including the current detector having a long response time is output from the A/D converter 13 in the current detection circuit 20 including the current detector 12 having a short response time to be adjusted, for the value of the same actual current. The time obtained by advancing the sampling interval corresponds to the amount of adjustment applied by the sampling adjustment unit 15 according to the second mode to the A/D converter 13 in the current detection circuit 20 including the current detector 12 having a short response time to be adjusted. When, for example, the characteristics of a Hall element type current detector 12 are matched with those of a shunt resistor type current detector, the sampling adjustment unit 15 according to the second mode advances the period in which the sampling interval of the successive approximation A/D converter 13 placed in the output stage of the Hall element type current detector 12 is set, to match this sampling interval with that of the ΔΣ modulation A/D converter placed in the output stage of the Hall element type current detector.

Figure 8A:
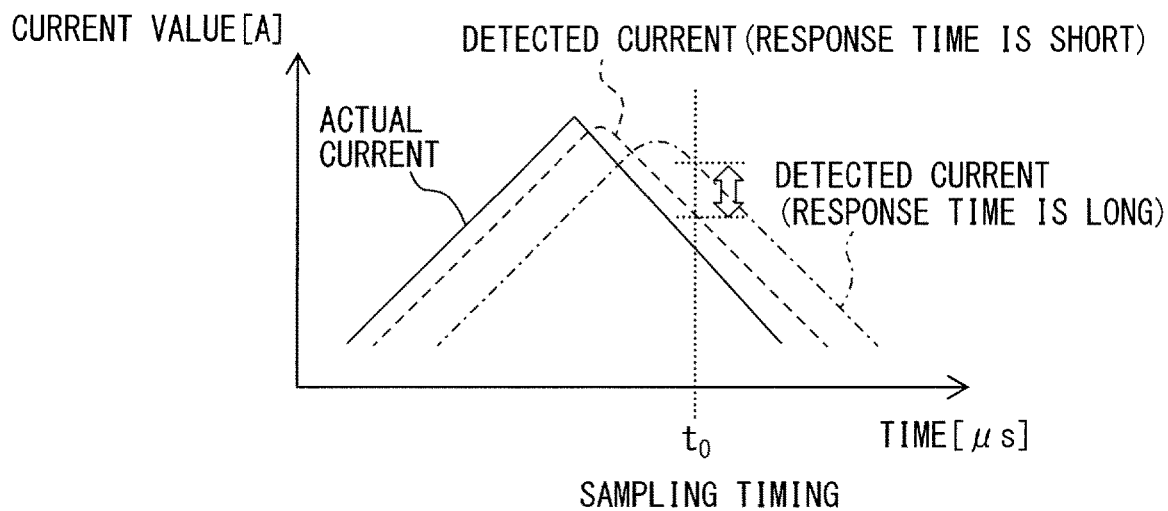
FIG. 8A is a graph illustrating an exemplary relationship between the inductance of the motor and the ripple of the current detected by the current detector and exemplifies the case where the inductance of the motor is low.
Figure 8B:
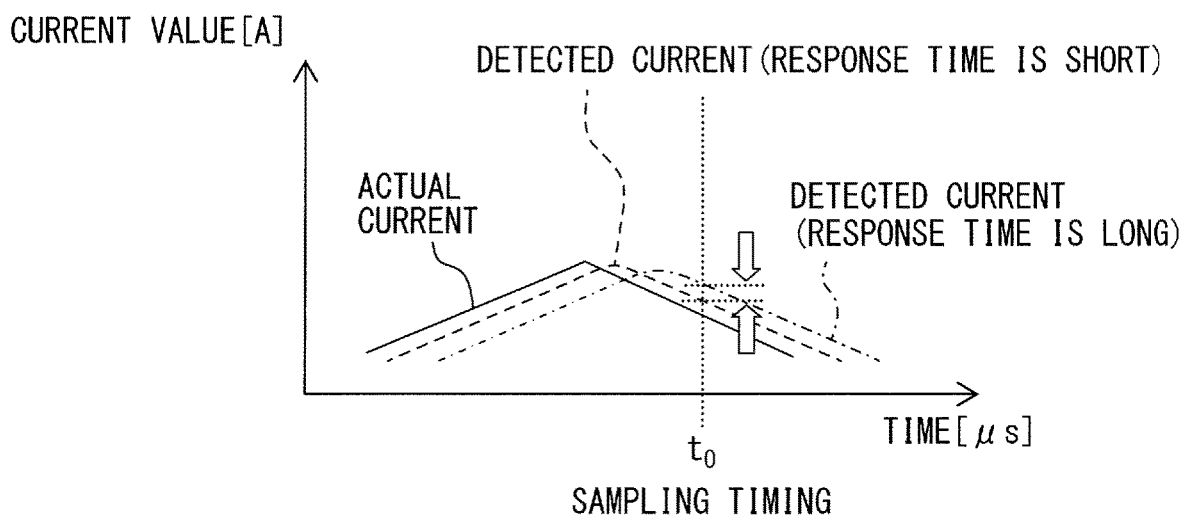
FIG. 8B is a graph illustrating an exemplary relationship between the inductance of the motor and the ripple of the current detected by the current detector and exemplifies the case where the inductance of the motor is high.

FIG. 8A is a graph illustrating an exemplary relationship between the inductance of the motor and the ripple of the current detected by the current detector and exemplifies the case where the inductance of the motor is low. FIG. 8B is a graph illustrating an exemplary relationship between the inductance of the motor and the ripple of the current detected by the current detector and exemplifies the case where the inductance of the motor is high.

For the waveform of the same actual current, the waveform (indicated by alternate long and short dashed lines in FIGS. 8A and 8B) of a current detector 12 having a long response time is delayed in time compared to the waveform (indicated by broken lines in FIGS. 8A and 8B) of a current detector 12 having a short response time, and when the response characteristic (detection rate) of the current detector 12 varies in this manner, the current value of digital data output from an A/D converter 13 (a successive approximation A/D converter in the example illustrated in FIGS. 8A and 8B) placed in the output stage of the current detector 12 varies depending on the difference in response characteristic (detection rate) of the current detector 12, even in the same sampling time (time $t_0$). The same applies to the $\Delta\Sigma$ modulation A/D converter 13. As illustrated in FIGS. 8A and 8B, the lower the inductance of the motor 2, the larger the ripple of a current flowing from the power conversion unit 11 into the motor 2 detected by the current detector 12, and therefore the lower the inductance of the motor 2, the larger the difference in current value of digital data output from the A/D converter 13 between a current detector 12 having a long response time and a current detector 12 having a short response time. Accordingly, the lower inductance of the motor 2 allows more effective adjustment of the sampling operation of the A/D converter 13 by the sampling adjustment unit 15.

The amount of adjustment applied by the sampling adjustment unit 15 according to each of the above-mentioned first and second modes to the A/D converter 13 in the current detection circuit 20 to be adjusted is set in the following way. For example, the same actual current can be detected by each of a current detection circuit 20 to be adjusted and a current detection circuit (i.e., a current detection circuit having a target response time; to be referred to as a "target current detection circuit" hereinafter) having characteristics with which the characteristics of the current detection circuit 20 to be adjusted are desirably matched, the current value of digital data output from the current detection circuit 20 to be adjusted can be compared with that of digital data output from the target current detection circuit, and a "temporal shift" in sampling timing or sampling interval of the A/D converter 13 which allows a match between these current values can be found out and set as the above-mentioned "amount of adjustment." Alternatively, a comparison may be made in motor controllability, e.g., acceleration and deceleration time, and a "temporal shift" in sampling timing or sampling interval which allows a match between their values may be found out and set as the above-mentioned "amount of adjustment." The "amount of adjustment" may even be obtained by an experiment. Or again, the "amount of adjustment" may be obtained by an adjustment amount calculation circuit (not illustrated) including a current source which supplies the same actual current to the current detection circuit 20 to be adjusted and the target current detection circuit, and an arithmetic circuit which compares the current value of digital data output from the current detection circuit 20 to be adjusted with that of digital data output from the target current detection circuit and finds out by arithmetic processing a "temporal shift" in sampling timing or sampling interval of the A/D converter 13 which allows a match between these current values. The adjustment amount calculation circuit, for example, compares the current value of digital data output from the current detection circuit 20 to be adjusted with that of digital data output from the target current detection circuit, while delaying or advancing, as appropriate, the period in which the sampling timing or the sampling interval is set in the A/D converter 13 to be adjusted, finds out a "temporal shift" when the deviation obtained as a result of comparison is minimized (preferably zero), and sets it as the "amount of adjustment." The amount of adjustment set by an experiment or the adjustment amount calculation circuit is input to the sampling adjustment unit 15, which performs adjustment to change the sampling timing (in a successive approximation A/D converter) or the sampling interval (in a $\Delta\Sigma$ modulation A/D converter) of the A/D converter 13 in the current detection circuit 20 to be adjusted, based on the input amount of adjustment.

As described above, with the motor drive device according to this embodiment, even when a plurality of current detectors located in the motor drive device or current detectors before and after replacement have a difference in response characteristic (response time or response speed) in the period after current detection until digital data output, since the sampling adjustment unit is used to perform adjustment to change the sampling timing (in a successive approximation A/D converter) or the sampling interval (in a $\Delta\Sigma$ modulation A/D converter) of an A/D converter in a current detection circuit including a current detector to be adjusted, variations in current detection value converted into digital data output from each current detection circuit can be kept less. Since the current control unit in the motor control unit of the motor drive device according to this embodiment performs current control using a current detection value converted into digital data, with less variations output from each current detection circuit, a given motor controllability can be maintained independently of the difference in response characteristic of a current detection circuit including a current detector and an A/D converter.

In the motor drive device according to this embodiment, in replacing a current detection circuit used for the motor drive device, the current detection circuit can even be easily adjusted by placing importance on the compatibility of response time (response speed) before and after replacement. When, for example, various circuits (e.g., a current control unit and a power conversion circuit) in the motor drive device are used as in the conventional technique, and only a current detection circuit is replaced with one including a latest current detector superior in, e.g., cost, size, thermal resistance, or humidity resistance and having a short response time (high response speed), since the sampling adjustment unit is used to perform adjustment to change the sampling timing (in a successive approximation A/D converter) or the sampling interval (in a $\Delta\Sigma$ modulation A/D converter) of an A/D converter in a current detection circuit to be adjusted, so that a current value converted into digital data identical to that obtained by a current detection circuit including a conventional current detector having a long response time (low response speed) is output for the same actual current, a given compatibility of response time (response speed) of the current detection circuit before and after replacement can be maintained, and a given motor controllability can, in turn, be maintained.

One aspect of the present disclosure can implement a motor drive device capable of maintaining a given motor controllability independently of the difference in response characteristic of a current detection circuit including a current detector and an A/D converter.

The invention claimed is:

1. A motor drive device comprising:
   a power conversion unit configured to supply a drive current to a motor;
   a current detector configured to detect a current flowing from the power conversion unit into the motor;
   an A/D converter configured to convert the current detected by the current detector into digital data and outputs the digital data;
   a motor control unit configured to control the drive current supplied from the power conversion unit to the motor, using the digital data output from the A/D converter; and
   a sampling adjustment unit configured to adjust a sampling operation of the A/D converter performed for the current detected by the current detector, in accordance with a response time taken after the current detector detects the current until the A/D converter outputs the digital data of the current,
   wherein the A/D converter comprises a successive approximation A/D converter, and
   the sampling adjustment unit performs adjustment to change a period in which a sampling timing of the successive approximation A/D converter is set for the current detected by the current detector, in accordance with the response time.

2. The motor drive device according to claim 1, wherein when the response time is longer than a predetermined target time, the sampling adjustment unit performs adjustment to delay the period in which the sampling timing is set, so that digital data identical to digital data obtained when sampling is performed at a sampling timing set in correspondence with the target time is output from the successive approximation A/D converter.

3. The motor drive device according to claim 2, wherein the current detector comprises a Hall element.

4. The motor drive device according to claim 1, wherein when the response time is shorter than a predetermined target time, the sampling adjustment unit performs adjustment to advance the period in which the sampling timing is set, so that digital data identical to digital data obtained when sampling is performed at a sampling timing set in correspondence with the target time is output from the successive approximation A/D converter.

5. The motor drive device according to claim 4, wherein the current detector comprises a shunt resistor.

6. A motor drive device comprising:
   a power conversion unit configured to supply a drive current to a motor;
   a current detector configured to detect a current flowing from the power conversion unit into the motor;
   an A/D converter configured to convert the current detected by the current detector into digital data and outputs the digital data;
   a motor control unit configured to control the drive current supplied from the power conversion unit to the motor, using the digital data output from the A/D converter; and
   a sampling adjustment unit configured to adjust a sampling operation of the A/D converter performed for the current detected by the current detector, in accordance with a response time taken after the current detector detects the current until the A/D converter outputs the digital data of the current,
   wherein the A/D converter comprises a $\Delta\Sigma$ modulation A/D converter, and
   the sampling adjustment unit performs adjustment to change a period in which a sampling interval of the $\Delta\Sigma$ modulation A/D converter is set for the current detected by the current detector, in accordance with the response time.

7. The motor drive device according to claim 6, wherein when the response time is longer than a predetermined target time, the sampling adjustment unit performs adjustment to delay the period in which the sampling interval is set, so that digital data identical to digital data obtained when sampling is performed in a sampling interval set in correspondence with the target time is output from the $\Delta\Sigma$ modulation A/D converter.

8. The motor drive device according to claim 6, wherein when the response time is shorter than a predetermined target time, the sampling adjustment unit performs adjustment to advance the period in which the sampling interval is set, so that digital data identical to digital data obtained when sampling is performed in a sampling interval set in correspondence with the target time is output from the $\Delta\Sigma$ modulation A/D converter.

* * * * *